Figure 1:
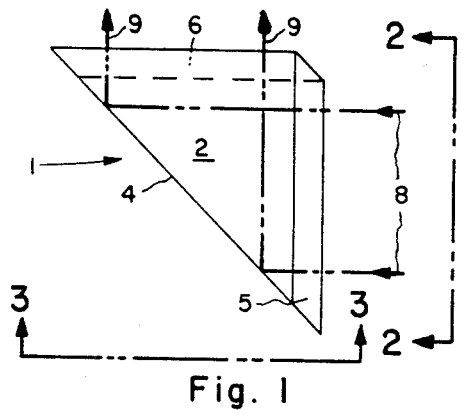

OR 3,625,587

[11] 3,625,587

[72] Inventor Nicolas J
Croton D___ ___, Ossining, N.Y. 10562
[21] Appl. No. 859,686
[22] Filed Sept. 22, 1969
[45] Patented Dec. 7, 1971

[54] VERSATILE COUPLER FOR INTERNAL REFLECTION SPECTROMETRY
10 Claims, 15 Drawing Figs.

[52] U.S. Cl. .................................................. 350/96, 350/286, 356/74, 356/244
[51] Int. Cl. .................................................. G02b 5/14
[50] Field of Search .................................................. 350/286, 287, 96 R; 356/244, 246

[56] References Cited
UNITED STATES PATENTS

| | | | |
|---|---|---|---|
| 3,393,603 | 7/1968 | Harrick | 350/286 |
| 3,486,829 | 12/1969 | Wilks, Jr. | 356/246 |
| 3,501,241 | 3/1970 | Hansen et al. | 356/244 |

FOREIGN PATENTS

| | | | |
|---|---|---|---|
| 503,012 | 3/1939 | Great Britain | 350/286 |

OTHER REFERENCES

Hirschfeld, " Procedures For Attenuated Total Reflection Study of Extremely Small Samples," April 1967, Applied Optics, Vol. 6, No. 4, pp. 715– 718

*Primary Examiner*—David Schonberg
*Assistant Examiner*—Michael J. Tokar

ABSTRACT: A versatile coupler for optically coupling a beam of radiation into or out of an internal reflection element for internal reflection spectroscopy is described. The coupler comprises a generally right-triangular member which is optically transparent and two of whose sides are bevelled but in opposite directions. In use, the vertically oriented beam enters at one side of the triangular coupler, internally reflects off its major surfaces and the hypotenuse and exits from the coupler at the opposite side from whence it enters the internal reflection element which is in optical contact with said opposite side.

PATENTED DEC 7 1971  3,625,587

SHEET 1 OF 2

INVENTOR.
N. J. HARRICK

INVENTOR.
N. J. HARRICK

VERSATILE COUPLER FOR INTERNAL REFLECTION SPECTROMETRY

This invention relates to internal reflection spectroscopy, and in particular to an optical coupling member for coupling radiation into and out of an internal reflection element.

Internal reflection spectroscopy is now a well established technique for obtaining optical spectra of a sample material. The sample material, which may be solid, powder, liquid, or thin film, is brought into contact with the totally reflecting surface of the internal reflection element, through which a beam of radiation is passed so as to totally internally reflect off of the surface containing the sample material. The evanescent wave from the radiation can interact with the sample and the extent of interaction is recorded by measuring the reflected or exiting beam intensity versus wavelength.

The internal reflection element is usually in the form of a thin plate, with the beam of radiation multiply reflecting from the plate's major surfaces of which at least one contains the sample material. Details of this spectroscopy technique including a complete bibliography, discussion of principles, instrumentation, and applications can be found in my book entitled "Internal Reflection Spectroscopy," Interscience Div., J. Wiley & Sons, N.Y., 1967, whose contents are hereby incorporated by reference.

For many applications it is preferred to arrange the internal reflection element horizontally with the sample material located on its top major surface. This arrangement causes difficulties. A major problem is that the beam receiving aperture of the element is thus oriented horizontally, whereas the slits of the spectrometer are conventionally oriented vertically. In order to introduce the beam into the element, the beam orientation has to be rotated 90°. One way of achieving this is to use a prism tilted at 45°, plus a mirror as shown on page 104 of my aforementioned book. A second similarly oriented prism plus mirror would then have to be used to extract the beam. This is a cumbersome solution.

On page 108 of my aforementioned book, I illustrate a vertically oriented double-pass multiple internal reflection plate having a rooftop-bevelled entrance and exit surface. This element will receive a vertically oriented beam. A difficulty encountered with this element is that, in use, the constant contacting of the surfaces with the sample material causes damage to them so that its total internal reflection properties suffer. Such plates have to be repolished to perform properly. The repolishing of a plate of such complex geometry is difficult and time-consuming.

One object of my invention is a novel coupling element for introducing a vertically oriented radiation beam into an internal reflection element having a horizontally oriented aperture.

A further object of the invention is a double-pass multiple reflection internal reflection plate capable of receiving a vertically oriented beam but of simpler geometry than that known heretofore for easier reprocessing.

Still another object of my invention is an optical coupling member for injecting and extracting a beam of radiation into and out of an internal reflection plate and capable of being used with many different kinds of internal reflection plates in many different geometries.

These and other objects of the invention as will appear hereinafter are achieved with a coupling element having a flat generally triangular shape of which the sides form a substantially right angle. The sides are constructed, as by bevelling for instance, to enable the incident beam to enter the member and impinge on a major surface at an angle permitting reflection therefrom onto the opposite major surface so as to cause the beam to propagate through the member by multiple reflections and such that it also reflects off of the hypotenuse surface, to exit from the member in a direction to enter the internal reflection element at the appropriate angle for internal reflection spectroscopy. In one embodiment, the coupling member is a solid prism. In another embodiment, the coupling member is a hollow body.

Figure 2:
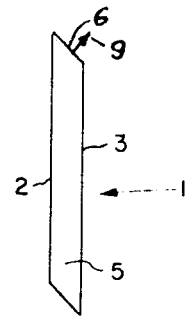
Figure 3:
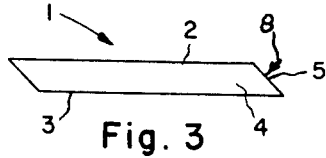
Figure 13:
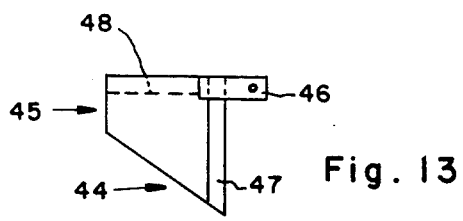
Figure 10:
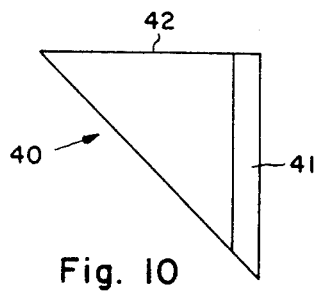
Figure 14:
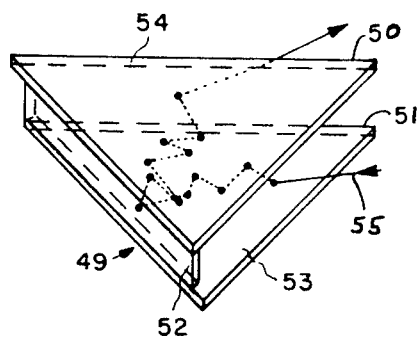
Figure 11:
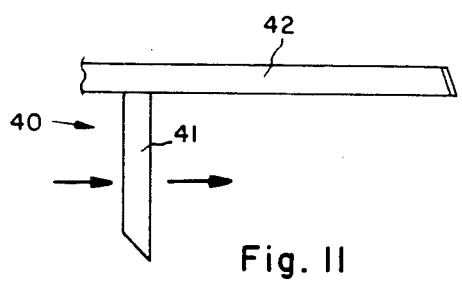
Figure 15:
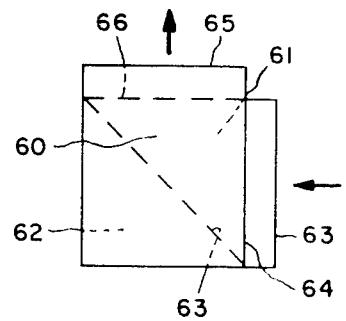
Figure 12:
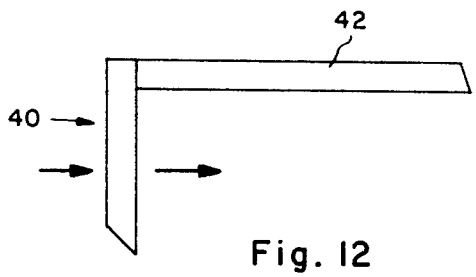

The invention will now be described in greater detail with reference to the accompanying drawings, wherein: FIG. 1 is a plan view of one form of solid optical coupling member of the invention; FIGS. 2 and 3 are side and front elevational views respectively of the coupling member shown in FIG. 1; FIGS. 4-9 show the coupling member of FIG. 1 coupled to various forms of internal reflection elements in different arrangements, with FIG. 6 being a side view of the perspective arrangement shown in FIG. 5; FIG. 10 is a plan view of a modified coupling member of the invention, and FIGS. 11 and 12 show how this modification may be used with an internal reflection element; FIG. 13 is a further modification of my novel coupling member; FIGS. 14 and 15 are still other modifications of my coupling member of the invention but in hollow form, with FIG. 14 being a perspective view and FIG. 15 a plan view.

FIGS. 1, 2 and 3 illustrate one embodiment of the coupling member of my invention. It comprises a solid body 1 of optically substantially transparent material in the form of a right-triangular thin flat plate all of whose surfaces are planar and optically polished. It comprises opposite major parallel surfaces 2, 3, a hypotenuse edge surface 4 perpendicular to the major surfaces, and side edge surfaces 5, 6 whose center lines form a right angle. The side edge surfaces 5, 6 are bevelled in opposite directions to form angles of 45° with the major surfaces 2, 3. The entrance for the beam of radiation 8 is the side edge surface 5, and the exit is the adjacent side edge surface 6. The spectrometer slits are usually oriented vertically, producing a narrow, rectangular, vertically oriented beam, which is directed normally at the 45° bevelled entrance surface 5 so as to substantially fill the aperture. The beam thus impinges on the back major surface 3 at a 45° angle. The material is chosen to have an index of refraction such that its critical angle is below 45°. Thus, the beam is totally internally reflected, and can propagate horizontally (FIG. 1) through the member by multiple reflections from the major surfaces 2, 3. The geometry is such that the beam will also totally internally reflect off of the hypotenuse side surface 4, then will propagate vertically through the member by multiple reflections from the major surfaces 2, 3, and finally will impinge on the exit surface 6 at right angles and pass out of the member as a beam 9. As will be observed, the exiting beam 9 will still have the form of a narrow rectangle, but now oriented horizontally instead of vertically, and thus rotated 90° relative to the incident beam 8, but also propagating at 45° relative to the horizontal (FIG. 2).

Figure 4:
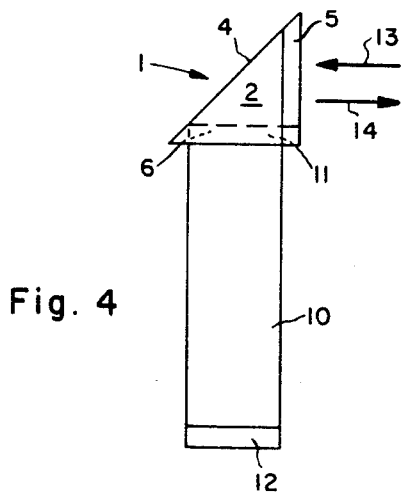

FIG. 4 illustrates one way of using the coupling member of FIG. 1 to form a vertical double-pass cell performing a similar function to that illustrated on page 108 of my aforementioned book, except that double-sampling also is present. In this case, the coupling member 1 is optically contacted to a multiple reflection internal reflection element 10 in the form of a plate of the same thickness as that of the coupling member 1 and also having a similarly 45° bevelled entrance surface 11. The entrance surface 11 of the element 10 is contacted to the exit surface 6 of the coupling member 1. To improve the contact, a drop of optically transparent liquid having an index comparable to that of the elements, such as, for example, Nujol, may be employed. The lower end 12 of the element 10, instead of being cut at an angle of 90° relative to its major surfaces, on which the sample is provided, is cocked at an angle of approximately 12°/$n$, where $n$ is the index of refraction, as described on page 105 and illustrated on page 107 of my aforementioned book to separate the exit beam from the entrance beam. This would provide a beam separation of about 24°. In operation, the vertically oriented entrance beam 13 impinges normally on the entrance surface 5 of the coupling member, then propagates through it by multiple internal reflections from the major surfaces 2 and 3, in the process totally internally reflecting off of the hypotenuse side surface 4, exits via the surface 6 and passes into the element 10, propagates downward through the internal reflection element 10 similarly to the manner illustrated in page 108 of my aforementioned book, totally internally reflects from the cocked end surface 12, propagates upwardly through the element by multiple internal reflections, reenters the coupling member 1, propagates through it by multiple internal reflections in the process reflecting off of the side surface 4, and exits as a beam 14 via the entrance surface 5 but at an angle from the incident beam 13 equal to the refractive index of the material times the angle of tilt of the cocked end 12. As will be noted, the element 10 can be readily separated from the coupling member 1, and thus any damage by the sample material to the element's surfaces is easily repaired by polishing only its surfaces.

Figure 5:
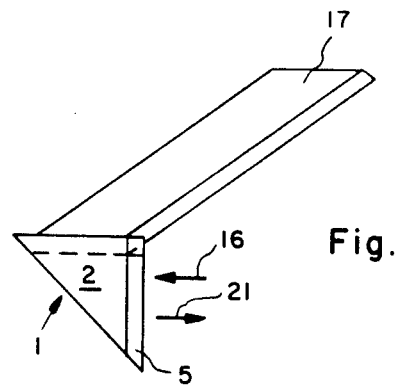
Figure 6:
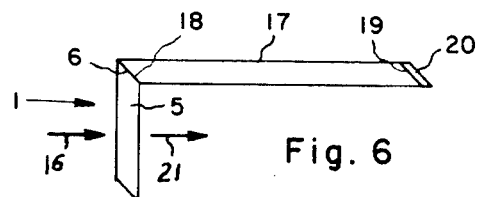

FIGS. 5-9 illustrate various ways in which my novel coupling element 1 may be employed to couple a vertically oriented beam from a spectrometer into a horizontally oriented internal reflection element. As will be clear from Chapter VI of my aforementioned book, the beam available from the commercial spectrometers is oriented in a vertical direction. Using such a beam in a multiple reflection plate requires that the plate be oriented vertically. This is also illustrated in U.S. Pat. No. 3,332,315. It is often much more convenient to orient the plate horizontally, for ease of applying the sample material. This is readily achieved with my novel coupling member. FIGS. 5 and 6 show the member 1 oriented to receive a vertical beam 16 and couple same into a horizontally arranged double-pass plate 17 having a 45° bevelled entrance surface 18 matched to the exit surface 6 of the coupling member. The opposite end 19 is bevelled and cocked as previously described. If the geometry is such that total internal reflection off of that cocked end is not possible, a reflecting metallized film 20 may be provided thereon. The beam, after multiple reflections through the member 1 and the element 17, exits as a beam 21 from the member, reoriented vertically and thus can reenter the spectrometer.

Figure 8:
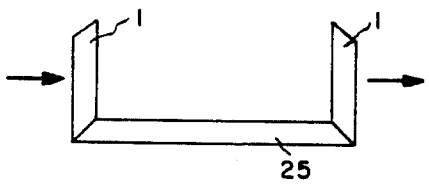
Figure 7:
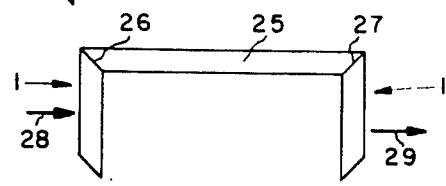

FIG. 7 shows a side view of a single-pass multiple reflection plate 25 with 45° bevelled entrance 26 and exit 27 end surfaces to which are contacted a pair of the coupling members 1 of the invention, one for coupling in the entrance beam 28 and one for extracting the exit beam 29 after interaction with a sample on the top major surface of the plate 25. FIG. 8 shows the identical geometry but inverted, which will provide a more convenient arrangement for supporting the input and output coupling members 1 in contact with the plate 25.

Figure 9:
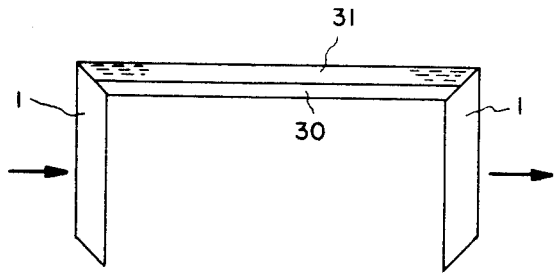

FIG. 9 illustrates an arrangement similar to FIG. 7 except that the plate 30 serving as the internal reflection element has approximately one-half the thickness of the coupling members 1 and only contacts the lower half of the bevelled surfaces, the remaining space being occupied by the sample material 31, in this case a liquid sample, held in place by the upwardly projecting edges of the coupling members 1.

FIGS. 10-12 illustrate in a plan view a modified form of coupling member 40 having only one bevelled edge 41 at 45° to its major surfaces, the adjacent edge 42 being orthogonal to the major surfaces similarly to the hypotenuse edge 43. FIG. 11 illustrates in a side view its use with a double-pass plate 43, whose bottom major surface is contacted by the orthogonal edge 42. An advantage of this arrangement is that the coupling member 40 can be readily shifted along the plate 43 to change the number of multiple internal reflections therein. FIG. 12 shows the coupling member 40 butted up against the end surface of the plate 43, which is another way in which it can be used.

FIG. 13 shows in a plan view a further modification of the coupling member 1 which has been extended upward to provide a short rectangular section, designated 45, designed to support a suitable mounting tab 46. The lower part of the member, designated 44, remains the same as that illustrated in FIG. 1 with an entrance bevel 47, but the exit bevel 48 has been moved to the top edge of the rectangular extension 45.

So far, the coupling member described has been a solid body akin to a prism, designed of a material to transmit the beam to the internal reflection element. Air is also a suitable substantially transparent material. FIG. 14 illustrates a modification using air and mirrors to reorient the beam in the direction desired. It comprises a hollow triangular member 49 composed of bottom and top planar parallel elements 50, 51 having internal mirror or reflecting surfaces forming a right triangle with a side edge element 52 also having an internal reflecting surface and forming the hypotenuse of the right triangle, whose sides 53, 54, which are open, form the entrance and exit apertures for the beam as shown. The sides being open are not bevelled, but the coupling member 49 will have to be supported relative to the beam and to the internal reflection element such that the beam, designated 55, impinges on the major reflecting surfaces at an oblique angle so that it propagates by multiple reflections as shown through the hollow member. Such a construction is not as efficient as the prism embodiment of FIG. 1 because the reflectivity of a mirror is never quite as high as total internal reflection, and thus some beam power is sacrificed. FIG. 15 illustrates a relatively simple way of achieving the geometry illustrated in FIG. 14 and with edges corresponding to a bevel contact. It comprises top and bottom rectangular plates 60, 61 with metallized reflecting inner surfaces which are overlapped as shown on opposite sides of a flat triangular spacer member 62 whose hypotenuse 63 is metallized to form a reflector. The plates 60, 61 may be cemented to the spacer 62. The right short edge 63 of the bottom plate 61 together with the right long side edge 64 of the top plate 60 defines a plane extending at a 45° angle to the planes of the plates 60 and 61. Similarly, the upper short edge 65 of the top plate 60 defines with the upper long edge 66 of the bottom plate 61 at 45° plane. These planes correspond to the bevelled edges 5 and 6 of the embodiment of FIG. 1. Thus, when the upper edges are contacted to the bevelled edge of the vertical plate 10 of FIG. 4 or the horizontal plate 17 of FIG. 5, the coupling member will be properly oriented thereto. An advantage of these hollow embodiments is that no reflection losses occur at the entrance and exit apertures of the member, and more importantly, optical contact to the plate is not required.

In the various embodiments described above, except for that of FIG. 14, the bevel angle of the entrance and exit apertures of the coupling member has been 45°. This is not essential to the invention. The angle can be varied over a range of approximately critical angle to grazing incidence for most materials. For the solid member, 45° is preferred because it provides the largest aperture and the normal incident beam will impinge on the major surface at an angle of incidence of 45° which will exceed the critical angle for most materials, and the exiting beam will also be normal to the exiting surface. This reduces reflection losses. Also, the 45° angle makes the coupling member more universally applicable with many different kinds of internal reflection elements having similarly angled bevels. If the bevel were chosen at a smaller angle, care would have to be taken to ensure that the angle of incidence on the major surface exceeds the critical angle. However, it will be further understood that the incident beam does not have to be normal to the entrance surface of the solid coupling member but can be varied over a liberal range, though of course some reflection losses will ensue. It is further noted that with a double-pass arrangement, the sample element having a cocked end, the exiting beam will not be normal to the entrance surface (now also serving as an exit surface) and the refraction that thus takes place provides the required separation of input from output beams. With the hollow embodiment, an even wider range of angles is possible since specular reflection rather than total reflection is employed.

The materials of which the coupling member may be composed are the same materials of which the internal reflection element may be composed, and many examples of suitable materials may be found in Chapter IV, Section F of my aforementioned book, which need not be repeated here. Further, suitable methods of preparation are also described in great detail in Chapter IV, Section E.

The geometry requirements for the coupling members are, again, similar to those for the internal reflection element, and this subject matter is treated in detail in Chapter IV, Section E, Subsection 3 of my aforementioned book. The optical coupling member of my invention is a special form of multiple reflection plate with the differences that no sample is provided on it and it only serves to inject and extract the beam from the active internal reflection element. Thus, the geometry can be chosen to provide any number of suitable multiple reflections of the beam between the major surfaces between the beam exits from the member at the desired angle and passes into the internal reflection element. As one suitable example, which is not to be regarded as limiting, to couple a beam having a length of 16 mm. and a width of about 2.12 mm. into an internal reflection element having an aperture of 16 mm. and a thickness of 1.5 mm., bearing in mind the desirability of keeping the number of reflections down and the amount of material small to reduce losses, I provide a $CaF_2$ prism as illustrated in FIG. 1 having sides of approximately 19.5 mm., a hypotenuse of 27.6 mm., and a thickness of 1.5 mm. With entrance and exit bevels at 45°, and a normal beam, the angle of incidence is 45° ($\theta c$ for $CaF_2$—Air is about 43°), and a ray at the center of the beam undergoes six reflections from the major surfaces before it reflects off of the hypotenuse surface, and six reflections afterwards before exiting normal to the exit surface. Also, while I have shown bevels on the side surfaces in opposite directions, it will be understood that the bevelled sides of, for example, the embodiment of FIG. 1 can be in the same direction. In certain instances, this may be preferred, as such an embodiment can serve either as a left or right handed unit for coupling to either end of the internal reflection plate.

It will be evident that my invention provides a remarkably versatile coupling member capable of greatly facilitating the use of internal reflection spectroscopy by affording improved arrangements of the internal reflection element, and simplifying the reconditioning of such elements. While I have described my invention in connection with specific embodiments and applications, I wish it to be understood that I do not intend to be limited thereby as various other modifications will readily suggest themselves to those skilled in this art without departing from the spirit of my invention.

What is claimed is:

1. A coupling member for use with a separate internal reflection element, comprising a generally triangular substantially optically transparent body having top and bottom planar parallel reflecting major surfaces separated by a distance small relative to the size of the major surfaces and a side diagonal planar reflecting surface extending between and normal to the major surfaces, said side diagonal reflecting surface forming an angle of 45° with opposite adjacent edges of the major surfaces, one set of edges adjacent one end of the side diagonal reflecting surface forming a substantially nonreflecting area oppositely located with respect to said side diagonal reflecting surface for receiving a radiation beam oriented in a given plane, the other set of edges adjacent the opposite end of the side diagonal reflecting surface forming a substantially nonreflecting area oppositely located with respect to said side diagonal reflecting surface through which the radiation beam can exit after reflection off of the major reflecting surfaces and the side diagonal reflecting surface, said body being positioned so as to receive the radiation beam image into its receiving area at an oblique angle causing the beam to reflect off both major surfaces and the side diagonal reflecting surface and exit through the exit area at an oblique angle relative to the major surfaces and rotated substantially 90° to its incident given plane, wherein the top reflecting surface edge at the other set of edges extends beyond the bottom reflecting surface edge thereat, whereas the bottom reflecting surface edge at the one set of edges extends beyond the top reflecting surface thereat, the edges of each set define a plane extending at an angle of 45° to the major surfaces, and the interior of the member is hollow.

2. The coupling member set forth in claim 1 in combination with a separable multiple reflection internal reflection plate having an entering surface in contact with the other edge set of the coupling member.

3. The combination of claim 2 wherein the coupling member is supported in a vertical plane, and the internal reflection element is supported in a horizontal plane, and the incident beam of radiation is oriented in a vertical plane.

4. A coupling member for use with a separate internal reflection element, comprising a generally right-triangular shaped thin flat body having planar, parallel major surfaces and side edges and a reflecting hypotenuse edge extending at an angle of approximately 45° to the side edges, both side edges being bevelled adapted to receive a beam of radiation at an angle to the plane of the major surfaces, said body being constituted of substantially optically transparent material such that a beam of radiation incident on one of the bevelled edges will propagate through the body by multiple reflections from the major surfaces, the other side edge enabling the beam to exit from the member after reflection from the hypotenuse, the exiting beam being rotated substantially 90° with respect to the incident beam the coupling member being adapted to mate with a separable multiple reflection internal reflection plate having a surface in contact with one side edge of the coupling member and oriented relative thereto such that the beam of radiation exiting from the coupling member enters the internal reflection plate to impinge upon the surfaces thereof at an angle exceeding the critical angle.

5. A coupling member as set forth in claim 4 wherein the member is oriented relative to the incident beam such that the angle of incidence of the beam on the major surfaces exceeds the critical angle.

6. A coupling member as set forth in claim 5 wherein both side edges are bevelled flat at an angle of 45° relative to the major surfaces.

7. A coupling member as set forth in claim 1 wherein the reflecting major surfaces are metallized.

8. A coupling member as set forth in claim 5 wherein the other side edge extends at right angles to the major surfaces.

9. The combination set forth in claim 4 wherein the contacting surfaces of the coupling member and internal reflection plate are bevelled flat at the same angle, and the thickness of the coupling member is of the same order as that of the internal reflection plate.

10. The combination of claim 9 wherein the end of the internal reflection plate remote from the coupling member is cocked at an angle to cause the returning beam to reimpinge on the entrance surface of the plate at an oblique angle.

* * * * *